(12) United States Patent
Okubo

(10) Patent No.: US 10,395,690 B2
(45) Date of Patent: Aug. 27, 2019

(54) MAGNETIC DISK DEVICE AND WRITE CAPABLE OF DETECTING DATA ERRORS AND PERFORMING READ-WRITE VERIFICATION THEREOF

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Tomokazu Okubo, Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 0 days.

(21) Appl. No.: 15/908,786

(22) Filed: Feb. 28, 2018

(65) Prior Publication Data

US 2019/0066728 A1    Feb. 28, 2019

(30) Foreign Application Priority Data

Aug. 23, 2017    (JP) ................. 2017-160434

(51) Int. Cl.
| G11B 20/10 | (2006.01) |
| G11B 5/09 | (2006.01) |
| G11B 5/012 | (2006.01) |
| G11B 19/04 | (2006.01) |

(52) U.S. Cl.
CPC ........ *G11B 20/10388* (2013.01); *G11B 5/012* (2013.01); *G11B 5/09* (2013.01); *G11B 19/041* (2013.01); *G11B 19/046* (2013.01); *G11B 2220/2508* (2013.01); *G11B 2220/2516* (2013.01)

(58) Field of Classification Search
None
See application file for complete search history.

(56) References Cited

U.S. PATENT DOCUMENTS

| 5,982,568 A | * | 11/1999 | Yamamoto | ............. | G11B 5/313 |
| | | | | | 324/212 |
| 6,101,053 A | * | 8/2000 | Takahashi | ............. | G11B 5/012 |
| | | | | | 360/46 |
| 2003/0156340 A1 | * | 8/2003 | Jen | ......... | B82Y 10/00 |
| | | | | | 360/31 |
| 2003/0202273 A1 | * | 10/2003 | Smith | ...... | G11B 5/41 |
| | | | | | 360/69 |
| 2004/0042105 A1 | * | 3/2004 | Cho | ......... | G11B 5/012 |
| | | | | | 360/31 |
| 2008/0010557 A1 | * | 1/2008 | Kume | .................. | G06F 11/008 |
| | | | | | 714/47.2 |

(Continued)

FOREIGN PATENT DOCUMENTS

| JP | 5-325308 A | 12/1993 |
| JP | 2004-241043 A | 8/2004 |

*Primary Examiner* — Tan X Dinh
(74) *Attorney, Agent, or Firm* — Kim & Stewart LLP

(57) ABSTRACT

A magnetic disk device includes a disk, a head configured to write data on the disk based on a write current, and a controller configured to determine whether a write error occurs when data is written on the disk, based on a change in a heating value of the head, and upon determining that the write error occurs, read the data written on the disk.

11 Claims, 10 Drawing Sheets

(56) References Cited

U.S. PATENT DOCUMENTS

| | | | |
|---|---|---|---|
| 2009/0251819 A1* | 10/2009 | Lee | G11B 5/40 360/75 |
| 2012/0194940 A1 | 8/2012 | Yoshida | |
| 2016/0104514 A1* | 4/2016 | Burnett | G11B 5/6088 369/13.02 |
| 2017/0162222 A1* | 6/2017 | Matousek | G11B 7/126 |

* cited by examiner

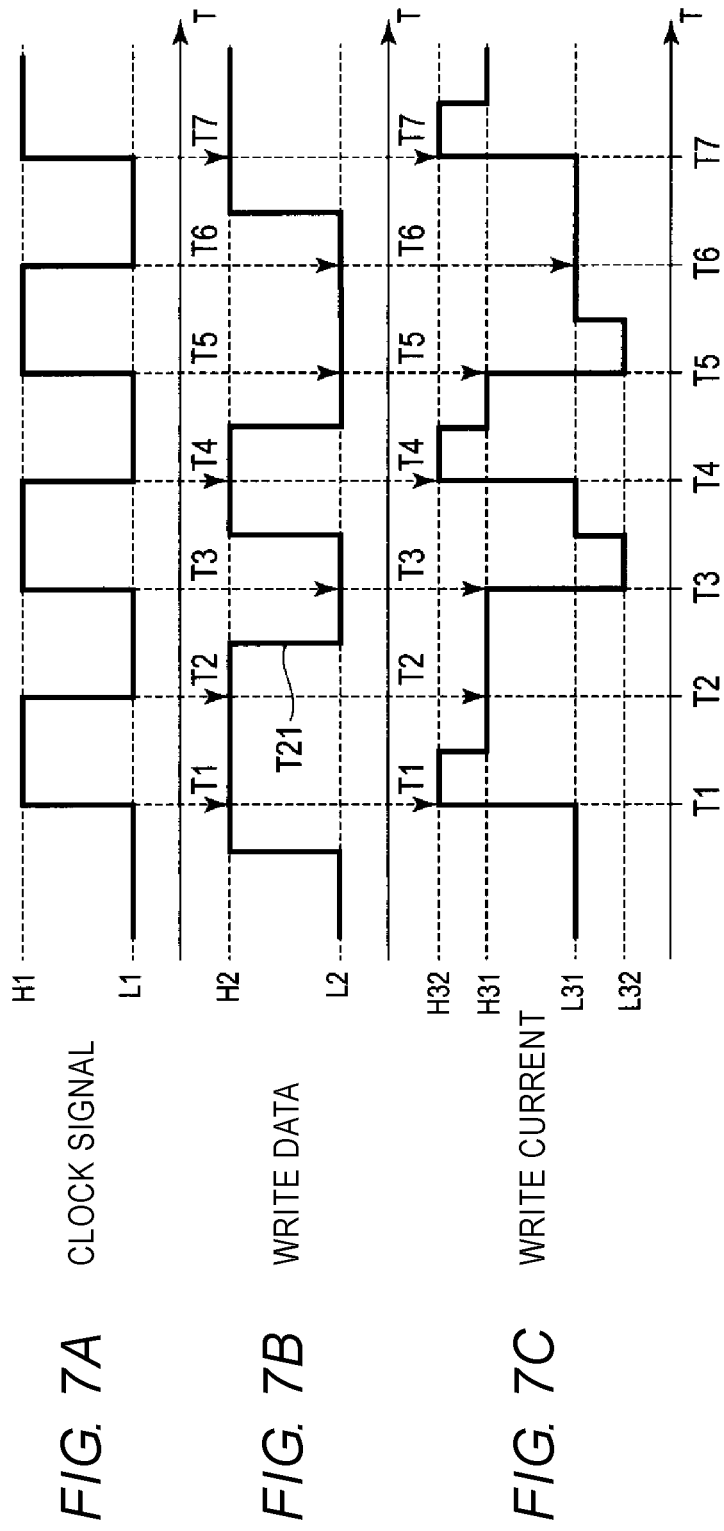

MAGNETIC DISK DEVICE AND WRITE CAPABLE OF DETECTING DATA ERRORS AND PERFORMING READ-WRITE VERIFICATION THEREOF

CROSS-REFERENCE TO RELATED APPLICATION

This application is based upon and claims the benefit of priority from Japanese Patent Application No. 2017-160434, filed Aug. 23, 2017, the entire contents of which are incorporated herein by reference.

FIELD

Embodiments described herein relate generally to a magnetic disk device and a write method.

BACKGROUND

A magnetic disk device generates a write current based on a data pattern of write data, and writes the data on a disk based on the generated write current. When generating the write current, the magnetic disk device may not be able to detect a portion of the data pattern of the write data. In this case, the magnetic disk device generates a write current based on the data pattern of the write data of which a portion is lost. Thus, a data error may occur in the data written based on the write current. The magnetic disk device may detect the data in which the data error occurs, by reading the written data and executing write verification thereon. However, when the write verification is executed each time data is written on the disk, the write performance of the magnetic disk device will be deteriorated.

DESCRIPTION OF THE DRAWINGS

FIG. 7A illustrates an example of a data pattern of a clock signal input to a head-amplifier integrated circuit (IC).

FIG. 7B illustrates an example of a data pattern of write data input to the head-amplifier IC.

FIG. 7C illustrates an example of a data pattern of a write current generated in the head-amplifier IC.

DETAILED DESCRIPTION

Embodiments provide a magnetic disk device and a write method in which reliability of data is improved.

In general, according to one embodiment, a magnetic disk device includes a disk, a head configured to write data on the disk based on a write current, and a controller that determines whether a write error occurs, based on a change in a heating value of the head which corresponds to a change in the write current, when data is written on the disk, and reads the data written on the disk when it is determined that the write error occurs.

Hereinafter, embodiments will be described with reference to the drawings. The drawings represent examples and do not limit the scope of the present disclosure.

(First Embodiment)

Figure 1:
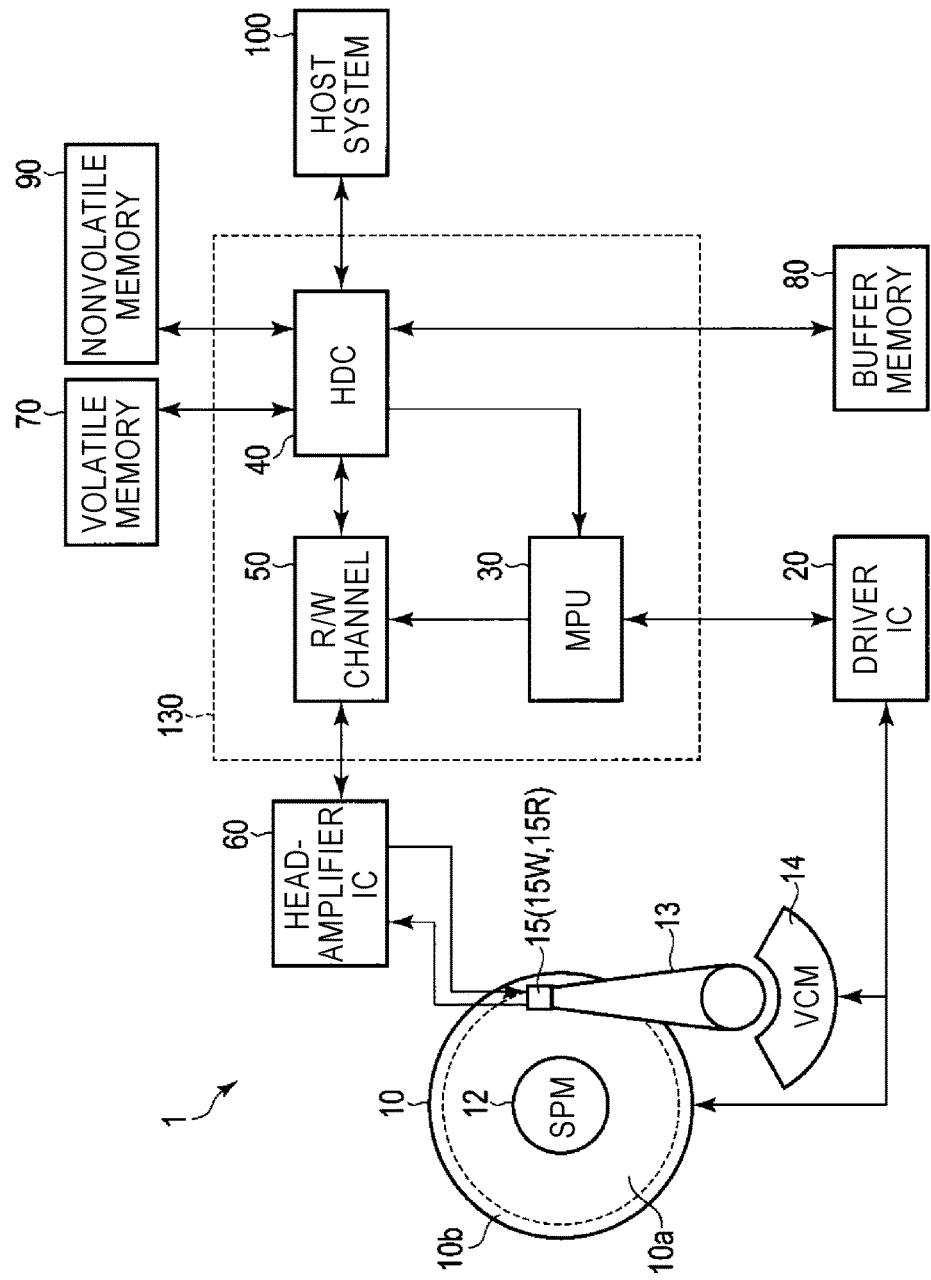
FIG. 1 is a block diagram illustrating a configuration of a magnetic disk device according to a first embodiment.

FIG. 1 is a block diagram illustrating a configuration of a magnetic disk device 1 according to a first embodiment.

The magnetic disk device 1 includes a head disk assembly (HDA), a driver IC 20, a head-amplifier integrated circuit (hereinafter, a "head-amplifier IC" or a "preamplifier") 60, a volatile memory 70, a buffer memory (buffer) 80, a nonvolatile memory 90, and a system controller 130 which is a single integrated circuit chip, as described below. In addition, the magnetic disk device 1 is connected to a host system (host) 100.

The HDA includes a magnetic disk (hereinafter, a "disk") 10, a spindle motor (SPM) 12, an arm 13 equipped with a head 15, and a voice coil motor (VCM) 14. The disk 10 is rotated by the spindle motor 12. The arm 13 and the VCM 14 form an actuator. The actuator controls the head 15 mounted on the arm 13 to be moved to a target position on the disk 10, by the driving of the VCM 14. Two or more disks 10 and two or more heads 15 may be provided.

In the recording region of the disk 10, a recording region 10a which is usable by a user and a system region 10b in which information necessary for system management is written are allocated.

The head 15 has a slider as a main body and includes a write head 15W and a read head 15R which are mounted on the slider. The write head 15W writes data on the disk 10. The read head 15R reads data recorded on the disk 10.

The driver IC 20 controls the driving of the SPM 12 and the VCM 14 according to a control by the system controller 130 (specifically, by an MPU 30 to be described later).

The volatile memory 70 is a semiconductor memory in which stored data is lost when a power supply is disconnected. The volatile memory 70 stores data needed by the respective units of the magnetic disk device 1 during operation. The volatile memory 70 is, for example, a dynamic random access memory (DRAM) or a synchronous dynamic random access memory (SDRAM).

The buffer memory 80 is a semiconductor memory that temporarily stores data and others transmitted and received between the magnetic disk device 1 and the host 100. In addition, the buffer memory 80 may be formed to be integrated with the volatile memory 70. The buffer memory 80 is, for example, a DRAM, a static random access memory (SRAM), an SDRAM, a ferroelectric random access memory (FeRAM), or a magnetoresistive random access memory (MRAM).

The nonvolatile memory 90 is a semiconductor memory in which stored data is maintained even when a power supply is disconnected. The nonvolatile memory 90 may be, for example, a NOR or NAND type flash read only memory (FROM).

The system controller (controller) 130 is implemented using, for example, a large-scale integrated circuit (LSI) called a system-on-a-chip (SoC) in which a plurality of elements are integrated in a single chip. The system controller 130 includes a microprocessor (MPU) 30, a hard disk controller (HDC) 40, and a read/write (R/W) channel 50. Each of the MPU 30, the HDC 40, and the R/W channel 50 includes a buffer (not illustrated) or a register (not illustrated). The system controller 130 is electrically connected to the driver IC 20, the head-amplifier IC 60, the volatile memory 70, the buffer memory 80, the nonvolatile memory 90, and the host system 100.

The MPU 30 is a main controller that controls the respective units of the magnetic disk device 1. The MPU 30 controls the VCM 14 via the driver IC 20 and executes a servo control to position the head 15. Further, the MPU 30 controls a write operation to write data on the disk 10 and selects a storage destination of write data transmitted from the host 100. The MPU 30 executes control of the respective units of the magnetic disk device 1 based on firmware. The MPU 30 is connected to the respective units of the magnetic disk device 1. For example, the MPU 30 is electrically connected to the HDC 40 and the R/W channel 50. In addition, the MPU 30 may be electrically connected to the head-amplifier IC 60.

The HDC 40 controls the data transmission between the host 100 and the R/W channel 50 according to an instruction from the MPU 30. The HDC 40 is electrically connected to the MPU 30, the R/W channel 50, the volatile memory 70, the buffer memory 80, the nonvolatile memory 90, and the host system 100.

The R/W channel 50 executes signal processing on read data and write data according to an instruction from the MPU 30. The R/W channel 50 has a circuit or a function to measure a signal quality of read data. The R/W channel 50 is electrically connected to the MPU 30, the HDC 40, and the head-amplifier IC 60.

During write processing, the head-amplifier IC 60 outputs a write current corresponding to write data which is input from the R/W channel 50, to the write head 15W. During read processing, the head-amplifier IC 60 amplifies read data which is read by the read head 15R and outputs the amplified data to the R/W channel 50. The head-amplifier IC 60 includes a buffer (not illustrated), a register (not illustrated), or a register I/F (not illustrated) enabling access to the register from the outside. The head-amplifier IC 60 is electrically connected to the head 15 and the R/W channel 50.

The head 15, the head-amplifier IC 60, and the controller 130 make up the system which writes data transmitted from the host 100 on the disk 10, and may hereinafter be referred to as a "write system."

Figure 2:
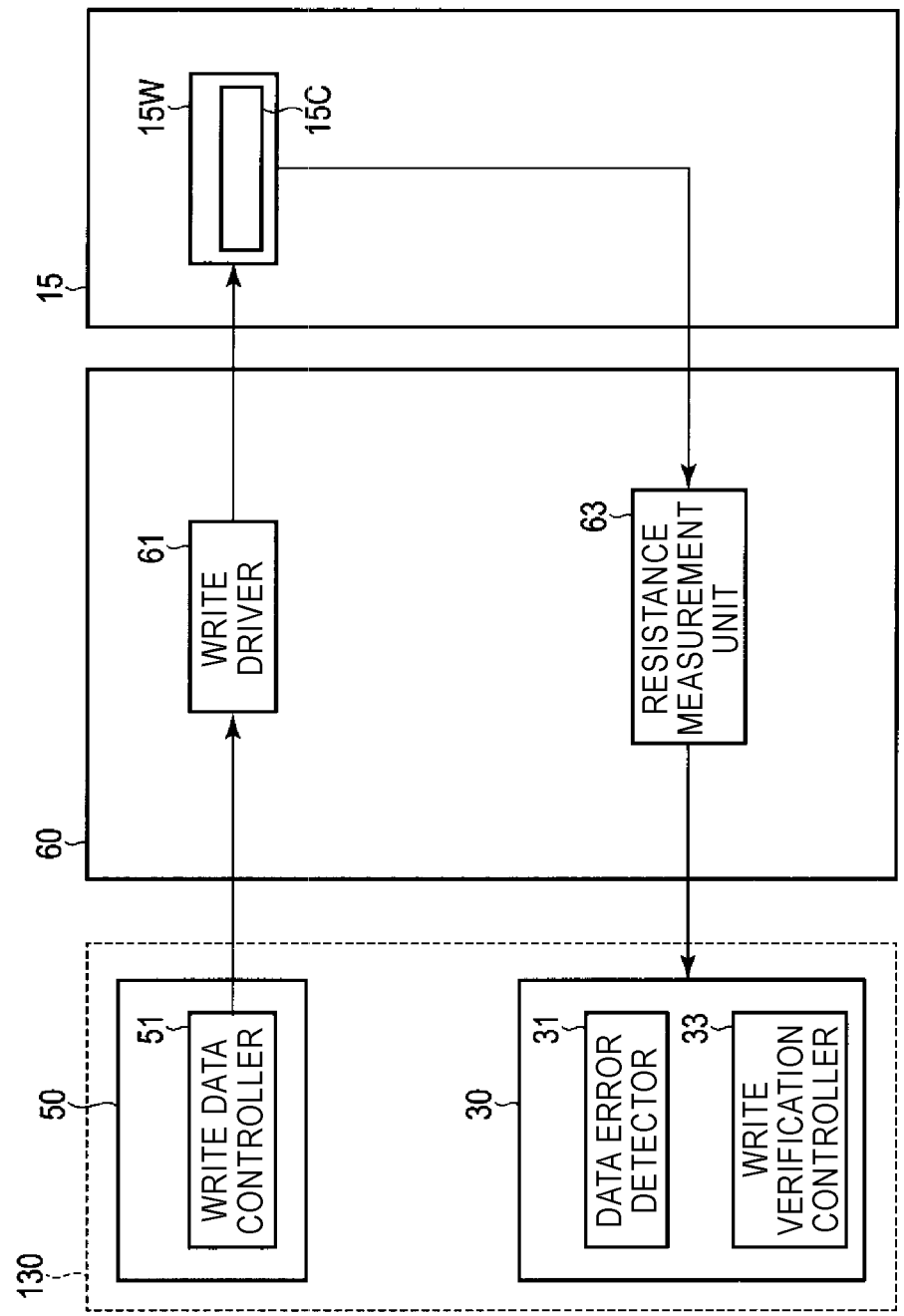
FIG. 2 is a schematic diagram illustrating an example of a configuration of a write system of the magnetic disk device according to the first embodiment.

FIG. 2 is a schematic diagram illustrating an example of a configuration of the write system of the magnetic disk device 1 according to the first embodiment. FIG. 2 illustrates only the components necessary for the description.

In the system controller 130, the R/W channel 50 includes a write data controller 51. The write data controller 51 is implemented by, for example, a circuit, and its operation is controlled by the MPU 30 or the HDC 40. The write data controller 51 executes a write compensation (also referred to as record compensation) processing on write data input from the host 100, and outputs the write data on which the write compensation processing has been executed, to the head-amplifier IC 60. The write compensation is a processing to cause a timing of polarity inversion (signal rise and fall) of a data pattern of write data to shift in advance by a nonlinear transition shift (NLTS). For example, the write data controller 51 includes a pseudo ECL (PECL) driver to perform the write compensation. Alternatively, the write data controller 51 may be provided in the HDC 40 of the system controller 130.

In the system controller 130, the MPU 30 includes a data error detector 31 and a write verification controller 33. The MPU 30 executes the functions of these respective units based on firmware.

The data error detector 31 detects whether a data error (hereinafter, also referred to as a "write error," "bit missing" or the like) occurs in the write processing on the disk 10, based on a change of a heating value (or a temperature) of the write head 15W which corresponds to a change of the write current. For example, the data error detector 31 detects whether a data error occurs in data written on the disk 10, based on a resistance value of the write head 15W which corresponds to a heating value (or a temperature) of the write head 15W (hereinafter, referred to as the "resistance value of the write head 15W"). The resistance value of the write head 15W includes a resistance value of a write coil 15C (to be described later), a resistance value of a heater HT (to be described later), a resistance value SC of an HDI sensor (to be described later) and others. The data error detector 31 receives the resistance value of the write head 15W which is measured by a resistance measurement unit 63 to be described later. The data error detector 31 determines whether the resistance value of the write head 15W is equal to or less than a threshold value, or larger than the threshold value. When it is determined that the resistance value of the write head 15W is equal to or less than the threshold value, the data error detector 31 determines that a data error occurs in the data written on the disk 10. For example, the data error detector 31 sets the threshold value as a resistance value of the write head 15W which corresponds to a bit per inch (BPI) format (an estimated recording frequency) for a predetermined zone of the disk 10. Here, the resistance value of the write head 15W which corresponds to the BPI format may be measured in advance at the manufacturing time or other times. In addition, the data error detector 31 may set the threshold value as a resistance value of the write head 15W at the time when data was previously written on the disk 10. In addition, the data error detector 31 may hold a threshold value for the divided zone of each predetermined recording region or each head of the disk 10. For example, the threshold value is recorded in the system region 10b of the disk 10 or the nonvolatile memory 90.

The write verification controller 33 executes write verification to read and verify the written data, based on a result of the detection by the data error detector 31. For example, when the data error detector 31 determines that a data error (or a write error) occurs, the write verification controller 33 reads the data written on the disk 10 (executes the write verification).

The head-amplifier IC 60 includes a write driver 61 and the resistance measurement unit 63. These components are implemented by, for example, circuits, and the operations thereof are controlled by the MPU 30 or the HDC 40. The write driver 61 generates a write current based on write data input from the write data controller 51, and outputs the generated write current to the write head 15W. For example, when write of high frequency data is requested from the host, the write driver 61 may not detect the polarity of a data pattern of the high frequency write data due to the signal quality of the write data (which is affected by a characteristic of a transmission path between the system controller 130 and the head-amplifier IC 60 or a characteristic of the write data controller 51). When the polarity of the data pattern of the write data is not able to be detected, the write driver 61 may generate a write current in which a part of frequency components is lost. That is, the write driver 61 may generate a write current in which a data error (e.g., missing bit) occurs. In the write current, when a part of the frequency components is lost, all of the frequency components may be deteriorated. The resistance measurement unit 63 detects the resistance value of the write head 15W, and inputs the data of the detected resistance value to the MPU 30. In the illustrated example, the resistance measurement unit 63 measures the resistance value of the write coil 15C to be described later, and inputs the measured resistance value of the write coil 15C to the MPU 30 via the R/W channel 50.

The write head 15W includes the write coil 15C. The write head 15W writes data on the disk 10 by generating a recording magnetic field based on the write current supplied to the write coil 15C. For example, when the write current in which the data error occurs is supplied to the write coil 15C, the write head 15W may write the data in which the data error occurs, on the disk 10 based on the write current. A heating value of the write head 15W varies depending on a heating value of the write coil 15C. When the structure of the head and the current value of the write current are constant, the heating value of the write coil 15C and the frequency components of the write current are in the one-to-one correlation. In other words, the heating value of the write coil 15C varies in response to a change of the write current. For example, when the effective frequency components of the write current are deteriorated, the heating value of the write coil 15C is deteriorated. Further, the resistance value of the write coil 15C varies in response to a change of the heating value of the write coil 15C. For example, when the heating value of the write coil 15C is deteriorated, the resistance value of the write coil 15C is deteriorated. Thus, the change of the frequency components of the write current may be detected by measuring a change of the resistance value of the write coil 15C using the resistance measurement unit 63. For example, when it is detected that the resistance value of the write coil 15C is deteriorated, the write current in which the frequency components are deteriorated, and a data error occurs. When the write current in which the data error occurs is detected, it may be estimated that a data error occurs in the data written on the disk 10.

Figure 3:
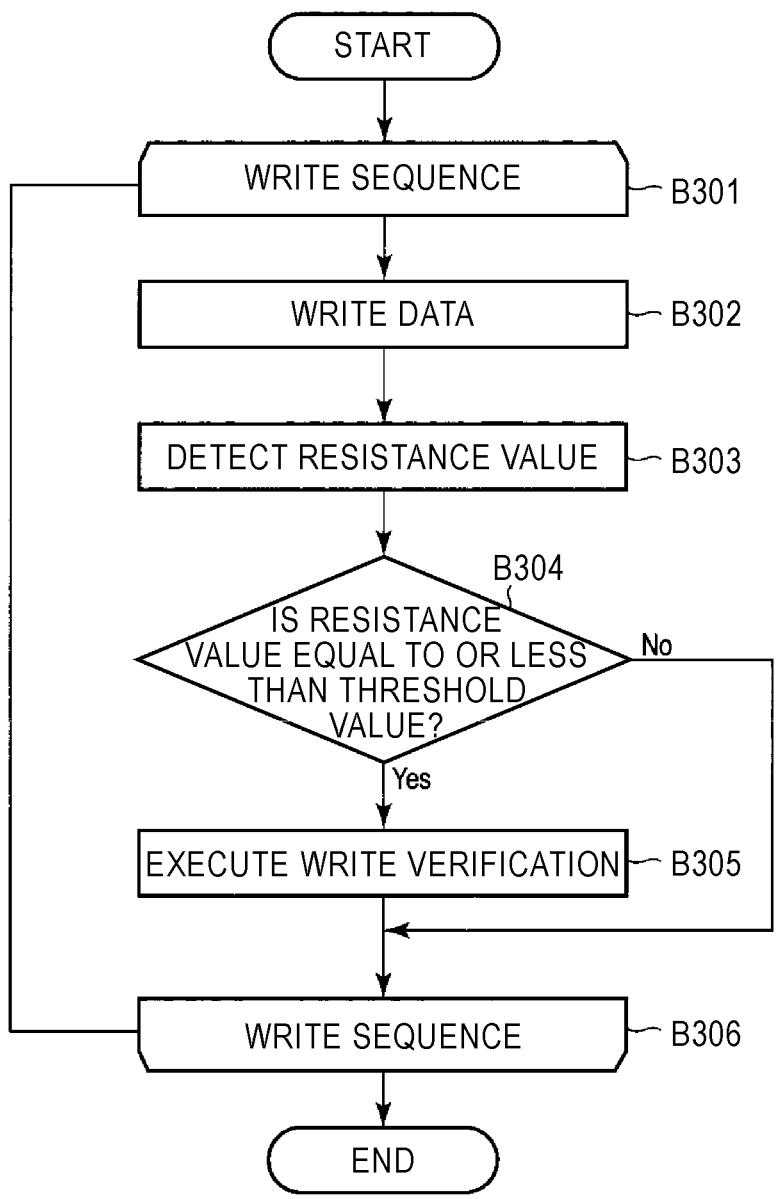
FIG. 3 is a flowchart illustrating an example of a write processing according to the first embodiment.

FIG. 3 is a flowchart illustrating an example of the write processing according to the first embodiment.

When write data is transmitted from the host 100, the controller 130 initiates a write sequence (B301). The controller 130 writes the data on target sectors of the disk 10 (B302). For example, the controller 130 writes the data on a plurality of consecutive sectors of the disk 10. The controller 130 measures the resistance value of the write head 15W which corresponds to the heating value of the head 15 (B303). For example, the controller 130 measures the resistance value of the write coil 15C. The controller 130 determines whether the resistance value of the write coil 15C is equal to or less than a threshold value, or larger than the threshold value (B304). When it is determined that the resistance value is equal to or less than the threshold value ("YES" in B304), the controller 130 determines that a data error (in this case, a write error) occurs, and executes the write verification (B305). For example, the controller 130 executes the write verification for the data previously written on the plurality of consecutive sectors, and then, ends the write sequence (B306). In addition, when it is determined that the resistance value is not equal to or less than the threshold value ("NO" in B304), the controller 130 does not execute the write verification and ends the write sequence (B306). The controller 130 repeats the processes of B302 to B305 until the write processing of the data transmitted from the host 100 is completed, and ends the write sequence (B306) to end the write processing.

According to the present embodiment, the magnetic disk device 1 measures the resistance value of the write coil 15C which corresponds to the heating value of the write head 15W, after writing the data on the disk 10. The heating value of the write head 15W varies in response to a change of the write current supplied to the write coil 15C. The magnetic disk device 1 determines whether the resistance value of the write coil 15C is equal to or less than a threshold value, or more than the threshold value. When it is determined that the resistance value of the write coil 15C is equal to or less than the threshold value, the magnetic disk device 1 determines that a data error occurs. When it is determined that a data error occurs, the magnetic disk device 1 executes the write verification for the data written on the disk 10. That is, when it is detected that the frequency components of the write current are deteriorated as compared with the frequency components of the normal write current (based on which it is determined that a data error occurs), the magnetic disk device 1 executes the write verification for the data written on the disk 10. Thus, in the magnetic disk device 1, the reliability of the written data is improved. Further, since the write verification is executed only when a data error is detected, the number of times for the execution of the write verification maybe reduced. As a result, the data processing speed (e.g., write speed) is improved, and the write performance of the magnetic disk device is improved.

The magnetic disk device 1 may be configured to calculate the heating value of the write head 15W from the resistance value of the write head 15W and a table representing the relationship between the resistance value and the heating value of the write head 15W, and determines whether a data error occurs, based on the calculated heating value. The magnetic disk device 1 measures the resistance value of the write head 15W which corresponds to the heating value of the write head 15W, after writing the data on the disk 10. The magnetic disk device 1 calculates the heating value of the write head 15W from the resistance value of the write head 15W and the table representing the relationship between the resistance value and the heating value of the write head 15W. The table representing the relationship between the resistance value and the heating value is recorded in, for example, the system region 10b of the disk 10 or the nonvolatile memory 90. The magnetic disk device 1 determines whether the calculated heating value of the write head 15W is equal to or less than a threshold value, or larger than the threshold value. When it is determined that the heating value of the write head 15W is equal to or less than the threshold value, the magnetic disk device 1 determines that a data error occurs, and executes the write verification for the data written on the disk 10.

Next, magnetic disk devices according to modifications and other embodiments will be described. In the modifications and other embodiments, the same parts as those of the above-described embodiment will be denoted by the same reference numerals as used in the above-described embodiment, and detailed descriptions thereof will be omitted.

(Modification 1)

A magnetic disk device 1 of Modification 1 is different from the first embodiment in that the magnetic disk device 1 of Modification 1 executes the write verification based on a resistance value of the heater HT provided in the head 15.

Figure 4:
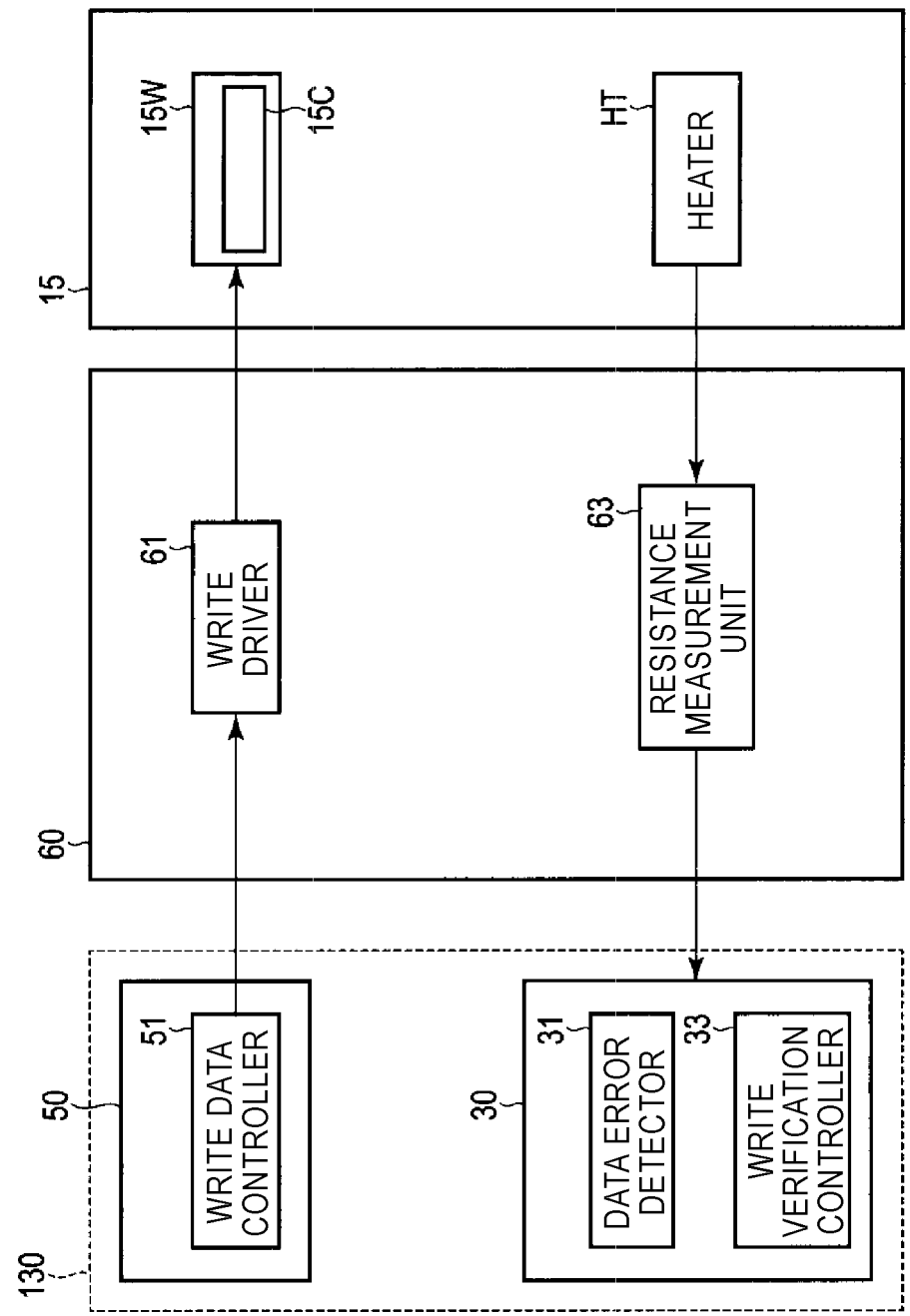
FIG. 4 is a schematic diagram illustrating an example of a configuration of a write system of a magnetic disk device according to a first modification.

FIG. 4 is a schematic diagram illustrating an example of a configuration of a write system of the magnetic disk device 1 according to Modification 1. FIG. 4 illustrates only the components necessary for descriptions.

In the illustrated example, the resistance measurement unit 63 measures a resistance value of the heater HT to be described later, and inputs the measured resistance value of the heater HT to the MPU 30 via the R/W channel 50.

The head 15 includes the heater HT. The heater HT is provided to implement the dynamic fly height control (DFH) function for controlling a fly height of the head 15. The heater HT includes a resistance element, and generates heat when a current is supplied from the head-amplifier IC 60. In addition, the heating value of the heater HT may vary depending on a change of the heating value of the write head 15W. For example, when the frequency components of the write current are deteriorated, the heating value of the heater HT may be deteriorated. Further, the resistance value of the heater HT may vary depending on the heating value of the heater HT. For example, when the heating value of the heater HT is deteriorated, the resistance value of the heater HT maybe deteriorated. That is, the change of the frequency components of the write current maybe estimated by detecting a change of the resistance value of the heater HT.

According to Modification 1, the magnetic disk device 1 measures the resistance value of the heater HT which corresponds to the heating value of the write head 15W, after writing the data on the disk 10. The magnetic disk device 1 determines whether the resistance value of the heater HT is equal to or less than a threshold value, or larger than the threshold value. When it is determined that the resistance value of the heater HT is equal to or less than the threshold value, the magnetic disk device 1 executes the write verification for the data written on the disk 10. Thus, in the magnetic disk unit 1, the reliability of the written data is improved. Further, since the write verification may be effectively executed, the write performance of the magnetic disk device 1 is improved.

(Modification 2)

A magnetic disk device 1 of Modification 2 is different from the above-described embodiment in that the magnetic disk device 1 of Modification 2 executes the write verification based on a resistance value of a head disk interface (HDI) sensor SC provided in the head 15.

Figure 5:
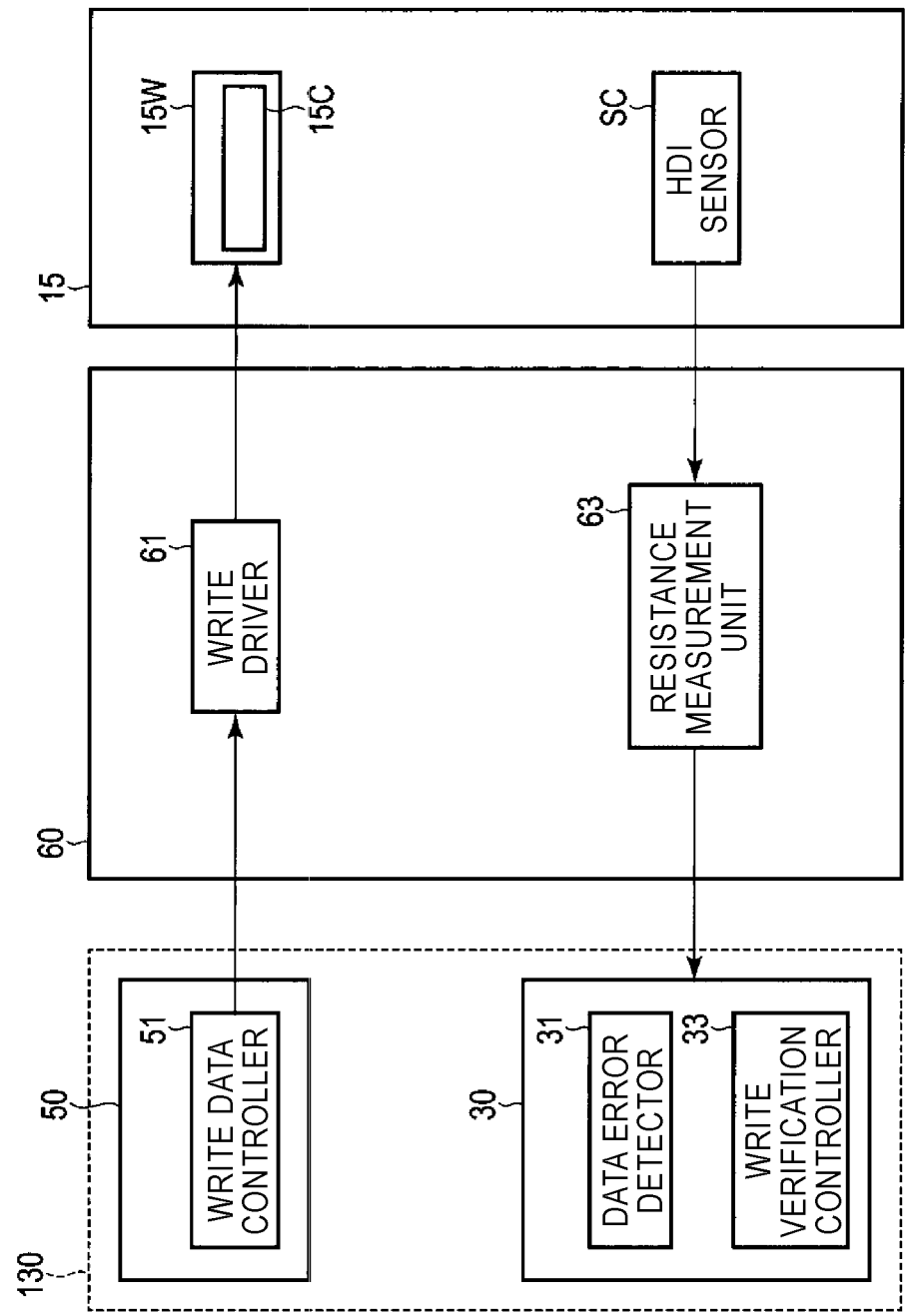
FIG. 5 is a schematic diagram illustrating an example of a configuration of a write system of a magnetic disk device according to a second modification.

FIG. 5 is a schematic diagram illustrating an example of a configuration of a write system of the magnetic disk device 1 according to Modification 2. FIG. 5 illustrates only the components necessary for descriptions.

In the illustrated example, the resistance measurement unit 63 measures a resistance value of the HDI sensor SC to be described later, and inputs the detected resistance value of the HDI sensor SC to the MPU 30 via the R/W channel 50.

The head 15 includes the HDI sensor SC. For example, the HDI sensor SC may detect frictional heat generated when the head 15 is in contact with the disk 10. The HDI sensor SC includes a resistance element, and detects a minute temperature change. The heating value of the HDI sensor SC may vary depending on a change of the heating value of the write head 15W. For example, when the frequency components of the write current are deteriorated, the heating value of the HDI sensor SC may be deteriorated. In addition, the resistance value of the HDI sensor SC may vary depending on the heating value of the HDI sensor SC. For example, when the heating value of the HDI sensor SC is deteriorated, the resistance value of the HDI sensor SC may be deteriorated. That is, the change of the frequency components of the write current may be estimated by detecting a change of the HDI sensor SC.

According to Modification 2, the magnetic disk device 1 measures the resistance value of the HDI sensor SC which corresponds to the heating value of the write head 15W, after writing the data on the disk 10. The magnetic disk device 1 determines whether the resistance value of the HDI sensor SC is equal to or less than a threshold value, or larger than the threshold value. When it is determined that the resistance value of the HDI sensor SC is equal to or less than the threshold value, the magnetic disk device 1 executes the write verification for the data written on the disk 10. Thus, in the magnetic disk device 1, the reliability of the written data is improved. Further, since the write verification may be effectively executed, the write performance of the magnetic disk device 1 is improved.

(Second Embodiment)

A magnetic disk device 1 of a second embodiment is different from the above-described embodiment in that the magnetic disk device 1 of the second embodiment has a pattern dependent write (PDW) function. The PDW is a technique of modulating amplitude of the write current. Hereinafter, the PDW will be described as a mode (clock mode) of superposing an overshoot current (hereinafter, simply referred to as "overshoot") or an undershoot current (hereinafter, simply referred to as "undershoot") on the write current according to a clock signal. In addition, "superposing an overshoot or undershoot on the write current" will be referred to as "boosting."

Figure 6:
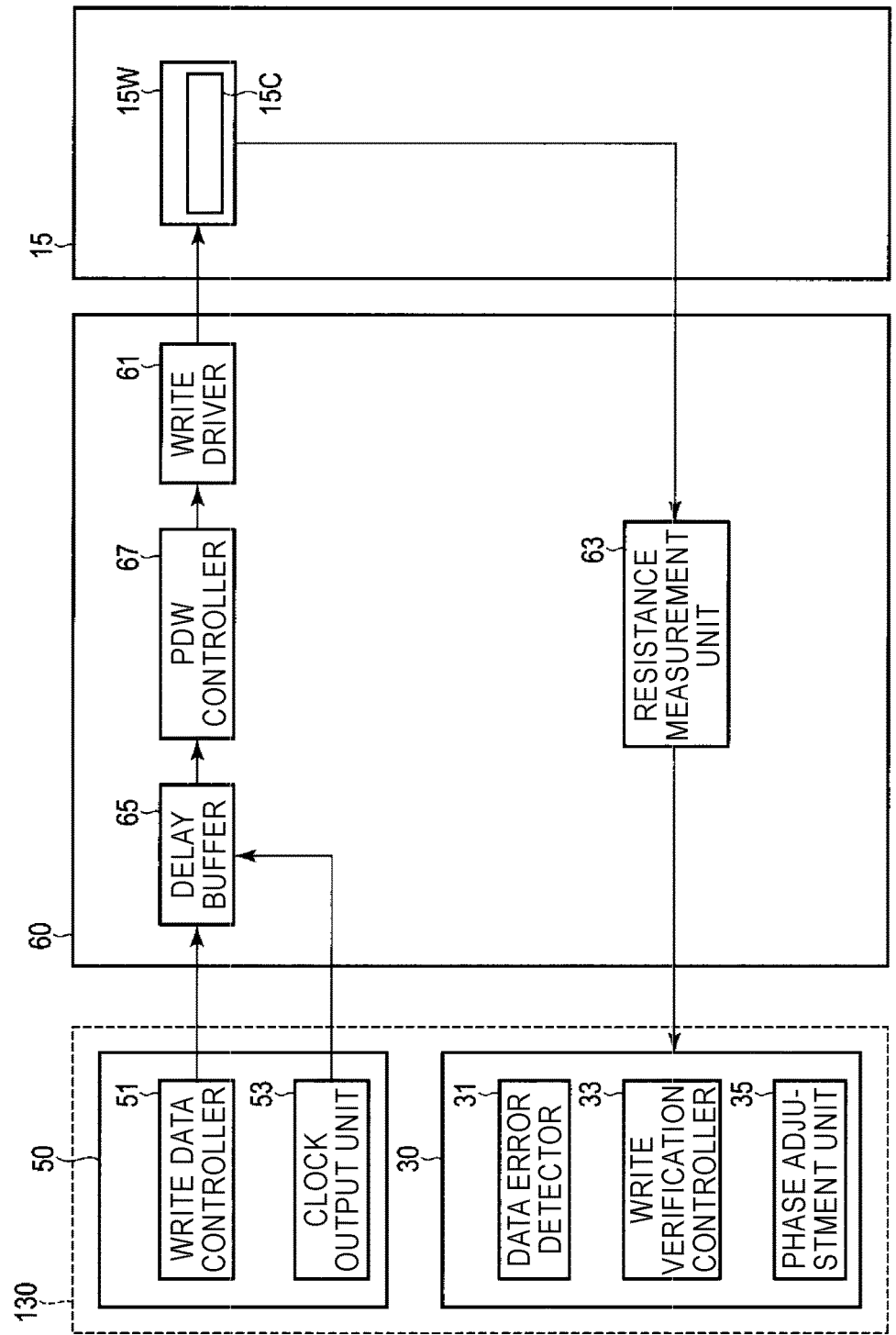
FIG. 6 is a schematic diagram illustrating an example of a configuration of a write system of a magnetic disk device according to a second embodiment.

FIG. 6 is a schematic diagram illustrating an example of a configuration of a write system of the magnetic disk device 1 according to the second embodiment. FIG. 6 illustrates only the components necessary for descriptions.

In the system controller 130, the R/W channel 50 includes a clock output unit 53, as the write system. The clock output unit 53 is implemented by, for example, a circuit, and its operation is controlled by the MPU 30 or the HDC 40. The clock output unit 53 outputs a clock signal of the same bit per second (BPS) as that of the write data output from the write data controller 51, to the head-amplifier IC 60. In addition, the clock output unit 53 may be provided in the HDC 40 of the system controller 130.

In the system controller 130, the MPU 30 includes a phase adjustment unit 35. The MPU 30 executes the functions of the phase adjustment unit 35 based on firmware. The phase adjustment unit 35 adjusts a phase between the write data output from the write data controller 51 and the clock signal output from the clock output unit 53, based on a result of the detection by the data error detector 31. For example, when the data error detector 31 determines that a data error occurs, the phase adjustment unit 35 adjusts the phase between the write data output from the write data controller 51 and the clock signal output from the clock output unit 53.

The head-amplifier IC 60 includes a write driver 61, a delay buffer 65, and a PDW controller 67. The delay buffer 65 outputs the write data and the clock signal input from the R/W channel 50, to the PDW controller 67. The PDW controller 67 detects the phases of the write data and the clock signal, and generates a boost signal based on polarities of the data patterns of the clock signal and the write data. For example, when a phase deviation occurs between the write data and the clock signal due to, for example, jitter or increasing time, the PDW controller 67 may not detect or may erroneously detect the polarity of the data pattern of the write data at a timing of polarity inversion of the data pattern of the clock signal. In this case, the PDW controller 67 may not generate a boost signal for the boosting at an appropriate timing. The PDW controller 67 outputs the write data, the clock signal, and the boost signal to the write driver 61. The write driver 61 generates a write current based on the write data, the clock signal, and the boost signal input from the PDW controller 67, and outputs the generated write current to the write head 15W. For example, when a phase deviation occurs between the write data and the clock signal due to, for example, jitter or increasing time, the write driver 61 may not detect or may erroneously detect the polarity of the data pattern of the write data based on the timing of the polarity inversion of the data pattern of the clock signal. When the polarity of the data pattern of the write data may not be detected, the write driver 61 may generate a write current in which apart of the frequency components is lost.

FIGS. 7A to 7C are views illustrating an example of a processing of the write current according to the second embodiment. In FIGS. 7A to 7C, the vertical axis represents a voltage or current, and the horizontal axis represents time. Hereinafter, a low level of voltage or current will be indicated with "low" (hereinafter, simply referred to as "L"), and a high level of voltage or current will be indicated with "high" (hereinafter, simply referred to as "H"). That is, indicates a higher level of voltage or current than "L."

FIG. 7A illustrates an example of the data pattern of the clock signal input to the head-amplifier IC 60. FIG. 7B illustrates an example of the data pattern of the write data input to the head-amplifier IC 60. FIG. 7C illustrates an example of the data pattern of the write current generated by the head-amplifier IC 60. In FIG. 7A, a voltage H1 is a higher level of voltage than a voltage L1. A zero level exists between the voltage H1 and the voltage L1. The voltage H1 and the voltage L1 are inverted from each other. For example, the data pattern of the clock signal illustrated in FIG. 7A represents a data pattern in which polarity inversion occurs every 1T. In FIG. 7B, a voltage H2 is a higher level of voltage than a voltage L2. A zero level exists between the voltage H2 and the voltage L2. The voltage H2 and the voltage L2 are inverted from each other. In FIG. 7C, a current H32 is larger than a current H31. The current H31 is larger than a current L31. The current L31 is larger than a current L32. The currents H32 and L32 indicate a boosted write current. A zero level exists between the current H32, H31 and the current L32, L31. The current H32, H31 and the current L32, L31 are inverted from each other. A point of the polarity inversion becomes an operation point.

The head-amplifier IC 60 generates a write current in synchronization with the timing of the polarity inversion of the data pattern of the clock signal. Further, the head-amplifier IC 60 detects the polarity of the data pattern of the write data at the timing of the polarity inversion of the data pattern of the clock signal input from the R/W channel 50. Based on the detected polarity of the data pattern of the write data, the head-amplifier IC 60 executes boosting for the write current. For example, when it is detected that the polarity of the data pattern of the write data is not inverted at the timing of the polarity inversion of the data pattern of the clock signal, the head-amplifier IC 60 does not invert the polarity of the data pattern of the write current. When it is detected that the polarity of the data pattern of the write data is inverted at the timing of the polarity inversion of the data pattern of the clock signal, the head-amplifier IC 60 inverts the polarity of the data pattern of the write current. Further, when it is detected that the polarity of the data pattern of the write data is inverted at the timing of the polarity inversion of the data pattern of the clock signal, the head-amplifier IC 60 executes boosting for the write current at the timing of the polarity inversion of the data pattern of the clock signal.

In the illustrated example, the head-amplifier IC 60 detects that the write data represented in FIG. 7B has the voltage H2 at a timing T1 when the clock signal represented in FIG. 7A rises to the voltage H1, and generates the boosted write current H32 as represented in FIG. 7C. The head-amplifier IC 60 detects that the write data represented in FIG. 7B has the voltage H2 at a timing T2 when the clock signal represented in FIG. 7A falls to the voltage L1, and generates the write current H31 represented in FIG. 7C. The head-amplifier IC 60 detects that the write data represented in FIG. 7B has the voltage L2 at a timing T3 when the clock signal represented in FIG. 7A rises to the voltage H1, and generates the write current L32 represented in FIG. 7C. The head-amplifier IC 60 detects that the write data represented in FIG. 7B has the voltage H2 at a timing T4 when the clock signal represented in FIG. 7A falls to the voltage L1, and generates the write current H32 represented in FIG. 7C. The head-amplifier IC 60 detects that the write data represented in FIG. 7B has the voltage L2 at a timing T5 when the clock signal represented in FIG. 7A rises to the voltage H1, and generates the write current L32 represented in FIG. 7C. The head-amplifier IC 60 detects that the write data represented in FIG. 7B has the voltage L2 at a timing T6 when the clock signal represented in FIG. 7A falls to the voltage L1, and generates the write current L31 represented in FIG. 7C. The head-amplifier IC 60 detects that the write data represented in FIG. 7B has the voltage H2 at a timing T7 when the clock signal represented in FIG. 7A rises to the voltage H1, and generates the write current H32 represented in FIG. 7C.

Figure 8A:
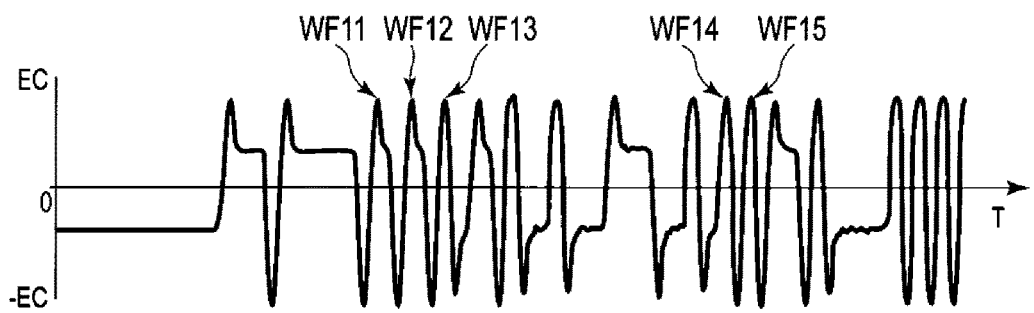
FIG. 8A illustrates an example of a waveform of a normal write current.
Figure 8B:
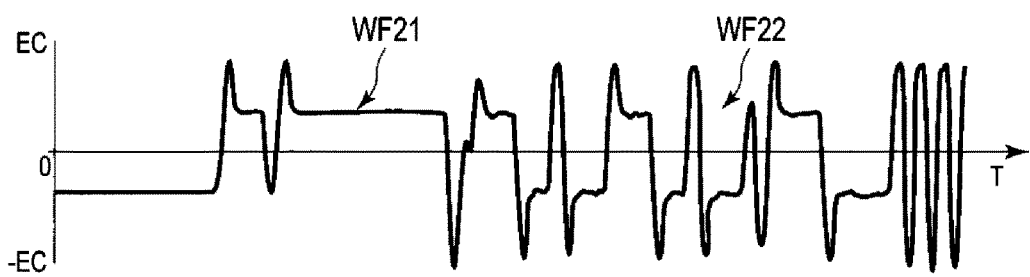
FIG. 8B illustrates an example of a waveform of a write current when a data error occurs.
Figure 8C:
FIG. 8C illustrates an example of a waveform of a write current when a data error occurs.

Each of FIGS. 8A, 8B, and 8C illustrates an example of a waveform of a write current. FIG. 8A illustrates an example of a waveform of a normal write current. In FIGS. 8A to 8C, the horizontal axis represents time, and the vertical axis represents the write current. Each of FIGS. 8B and 8C illustrates an example of a waveform of a write current when a data error (e.g., bit missing) occurs.

Frequency components WF11, WF12, and WF13 of the write current represented in FIG. 8A are lost in a frequency component W21 of the write current represented in FIG. 8B. Further, the frequency components WF11 and WF13 of the write current represented in FIG. 8A are lost in a frequency component W31 of the write current represented in FIG. 8C.

For example, the head-amplifier IC 60 generates the data pattern of the write current represented in FIG. 7C based on the data pattern of the clock signal represented in FIG. 7A and the data pattern of the write data represented in FIG. 7B, and outputs the normal write current represented in FIG. 8A to the write head 15W. When a relative phase deviation occurs between the data pattern of the clock signal represented in FIG. 7A and the data pattern of the write data represented in FIG. 7B, the head-amplifier IC 60 may not be able detect or may erroneously output the polarity of the data pattern of the write data at the timing of the polarity inversion of the data pattern of the clock signal. For example, when the falling timing T2 of the clock signal represented in FIG. 7A overlaps with the falling timing T21 of the write data represented in FIG. 7B, the head-amplifier IC 60 may not be able to detect the polarity of the data pattern of the write data. In this case, the head-amplifier IC 60 may generate a write current in which a part of the frequency components is lost, and output the write current in which a part of the frequency components is lost (such that a data error occurs) as represented in FIG. 8B or 8C to the write head 15W.

Figure 9:
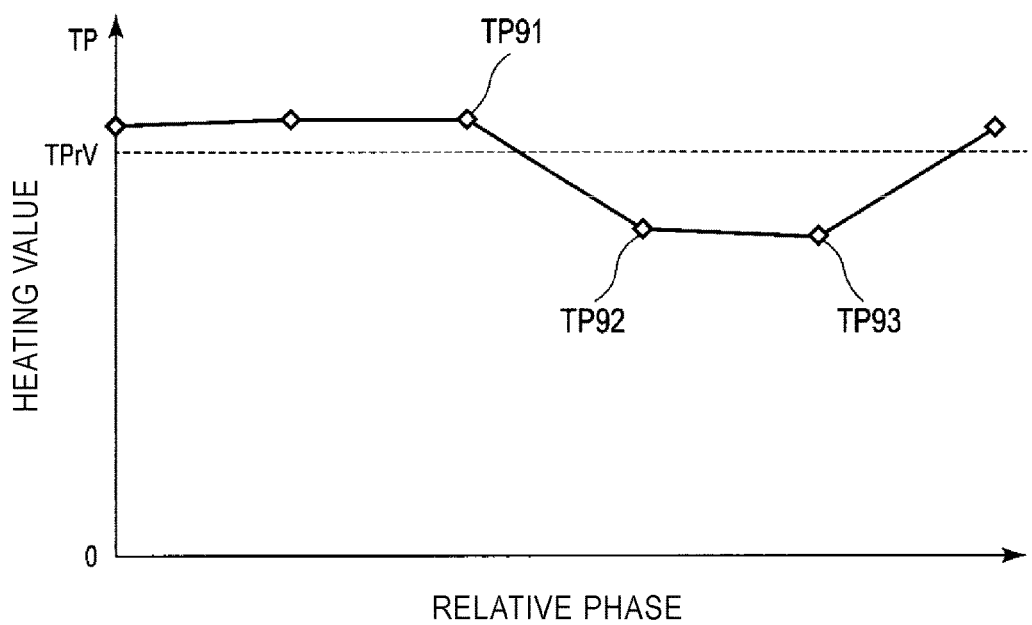
FIG. 9 illustrates an example of a change in a heating value of a write coil.

FIG. 9 illustrates an example of a change in a heating value of the write coil 15C. In FIG. 9, the vertical axis represents a heating value, and the horizontal axis represents a relative phase between the clock signal and the write data. For example, the unit of the heating value is a Joule loss (Joule heat). For example, the horizontal axis is on the order of a picosecond. In FIG. 9, a reference value TPrv indicates a heating value of the write coil when the normal write current is supplied to the write coil. Here, the reference value TPrv corresponds to a threshold value of the resistance value. In FIG. 9, a heating value TP91 indicates a heating value of the write coil 15C when the write current having the waveform represented in FIG. 8A is supplied. A heating value TP92 indicates a heating value of the write coil 15C when the write current having the waveform represented in FIG. 8B is supplied. A heating value TP93 indicates a heating value of the write coil 15C when the write current having the waveform represented in FIG. 8C is supplied.

In the illustrated example, the heating value TP91 is larger than the reference value TPrv. The heating values TP92 and TP93 are equal to or less than the reference value TPrv. Thus, when the resistance value of the write coil 15C which corresponds to the heating value T91 is detected, the head-amplifier IC 60 determines that the resistance value is larger than the threshold value, and determines that no data error occurs in the data written on the disk 10. When the resistance value of the write coil 15C which corresponds to the heating value T92 is detected, the head-amplifier IC 60 determines that the resistance value is equal to or less than the threshold value, and determines that a data error occurs in the data written on the disk 10. When the resistance value of the write coil 15C which corresponds to the heating value T93 is detected, the head-amplifier IC 60 determines that the resistance value is equal to or less than the threshold value, and determines that a data error occurs in the data written on the disk 10.

Figure 10:
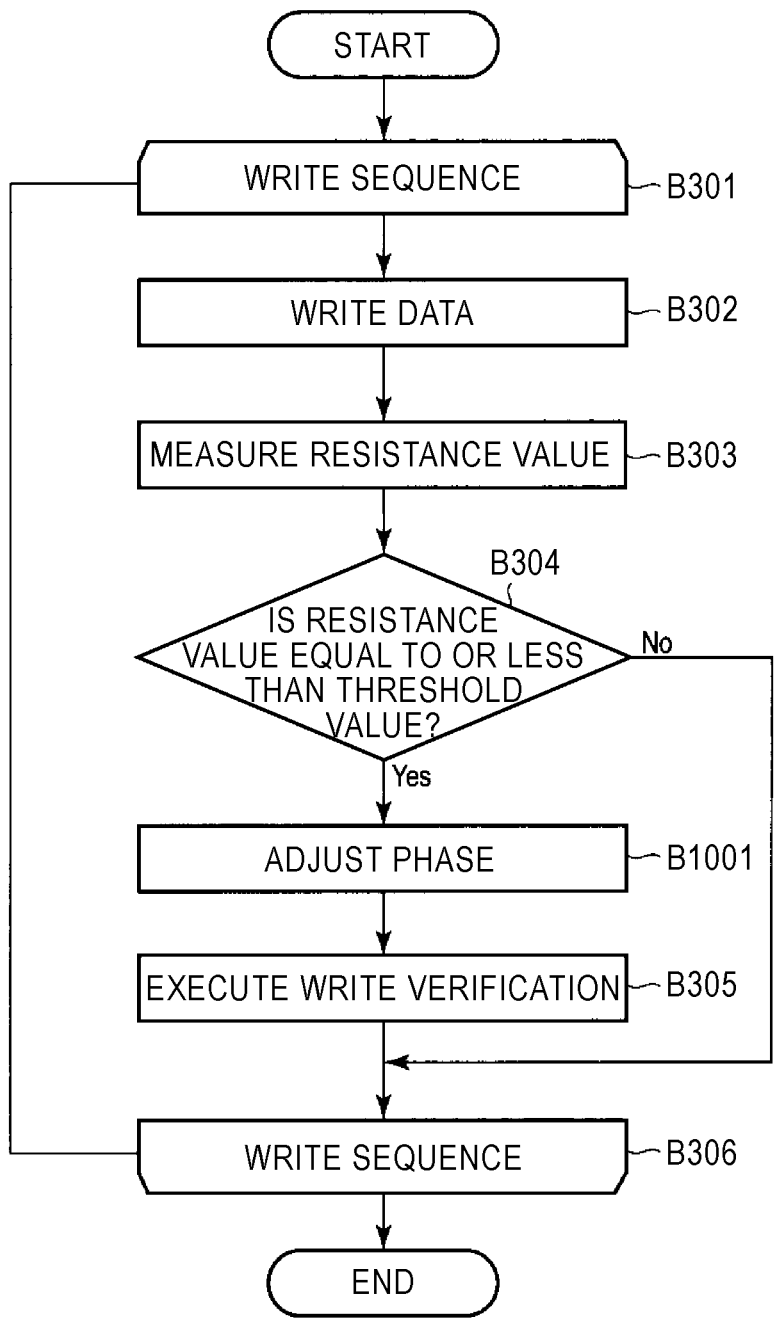
FIG. 10 is a flowchart illustrating an example of a write processing according to the second embodiment.

FIG. 10 is a flowchart illustrating an example of a write processing according to a second embodiment.

The controller 130 executes the above-described processes from B301 to B303, and determines whether the resistance value of the write coil 15C is equal to or less than a threshold value, or larger than the threshold value (B304). When it is determined that the resistance value of the write head 15W is equal to or less than the threshold value ("YES" in B304), the controller 130 determines that a data error (write error) occurs, and adjusts the phases of the write data and the clock signal (B1001). For example, the controller 130 adjusts the phases of the write data and the clock signal such that the polarity of the data pattern of the write data may be detected at the timing of the polarity inversion of the data pattern of the clock signal. The controller 130 executes the write verification (B305). For example, the controller 130 executes the write verification for the data previously written on a plurality of consecutive sectors. The controller 130 repeats the processes of B302 to B305 until the write processing of the data transmitted from the host 100 is completed, and ends the write sequence (B306) to end the write processing.

According to the present embodiment, the magnetic disk device 1 has the PDW function. When it is detected that the frequency components of the write current are deteriorated as compared with the frequency components of the normal write current, for example, when it is detected that a data error occurs, due to an occurrence of a phase deviation between the clock signal and the write data, the magnetic disk device 1 executes the write verification for the data written on the disk 10. In this case, the magnetic disk device 1 adjusts the phase between the write data and the clock signal. Thus, in the magnetic disk device 1, the reliability of the written data is improved. Further, since the write verification may be effectively executed, the write performance of the magnetic disk device 1 is improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein maybe made without departing from the spirit of the inventions. The accompanying claims and their equivalents are intended to cover such forms or modifications as would fall within the scope and spirit of the inventions.

What is claimed is:

1. A magnetic disk device comprising:
    a disk;
    a head configured to write data on the disk based on a write current, wherein the head includes a write coil to which the write current is supplied, and a heating value of the head changes in accordance with a resistance value of the write coil; and
    a controller configured to:
        determine that a write error occurs when data is written on the disk, upon determining that the resistance value of the write coil is less than a threshold value, and
        upon determining that the write error occurs, read the data written on the disk.

2. The magnetic disk device according to claim 1, wherein the controller sets the threshold value as a resistance value of the write coil at a previous writing time.

3. The magnetic disk device according to claim 1, further comprising:
    an integrated circuit configured to output the write current of which amplitude is modulated based on a clock signal and write data, to the head, and including a measurement unit that measures a resistance value of the write coil which corresponds to a change in the write current, wherein
    when the measured resistance value is less than the threshold value, the controller determines that the write error occurs and reads the data written on the disk.

4. The magnetic disk device according to claim 3, wherein when the measured resistance value is less than the threshold value, the controller adjusts phases of the clock signal and the write data.

5. A magnetic disk device comprising:
    a disk;
    a head including a write coil to which a write current is supplied and a head disk interference sensor that includes a resistance element, the head being configured to write data on the disk based on the write current;
    an integrated circuit configured to output the write current of which amplitude is modulated based on a clock signal and write data, to the head, and including a measurement unit that measures a resistance value of the resistance element; and
    a controller configured to determine that a write error occurs and read the data written on the disk, when the resistance value is less than the threshold value.

6. The magnetic disk device according to claim 5, wherein the controller sets the threshold value as a resistance value of the write coil at a previous writing time.

7. The magnetic disk device according to claim 5, wherein when the measured resistance value is less than the threshold value, the controller adjusts phases of the clock signal and the write data.

8. A method of performing a write in a magnetic disk device having a disk and a head configured to write data on the disk based on a write current, said method comprising:
   measuring a resistance value of a write coil in the head to which the write current is supplied, the resistance value of the write coil affecting a heating value of the head;
   determining that a write error occurs when data is written on the disk, upon the resistance value of the write coil being less than a threshold value; and
   upon determining that the write error occurs, reading the data written on the disk.

9. The method according to claim 8, wherein the threshold value is set as a resistance value of the write coil at a previous writing time.

10. The method according to claim 8, further comprising: when the measured resistance value is less than the threshold value, adjusting phases of the clock signal and the write data.

11. The method according to claim 8, further comprising:
   generating the write current of which amplitude is modulated based on a clock signal and write data; and
   when the write error occurs, adjusting phases of the clock signal and the write data.

\* \* \* \* \*